United States Patent
Ogilvie

(10) Patent No.: US 9,582,252 B1
(45) Date of Patent: *Feb. 28, 2017

(54) ADAPTIVELY SHRINKING SOFTWARE

(71) Applicant: Open Invention Network LLC, Durham, NC (US)

(72) Inventor: John W. L. Ogilvie, Salt Lake City, UT (US)

(73) Assignee: Open Invention Network LLC, Durham, NC (US)

( * ) Notice: Subject to any disclaimer, the term of this patent is extended or adjusted under 35 U.S.C. 154(b) by 66 days.

This patent is subject to a terminal disclaimer.

(21) Appl. No.: 14/733,838

(22) Filed: Jun. 8, 2015

Related U.S. Application Data

(63) Continuation of application No. 14/158,132, filed on Jan. 17, 2014, now Pat. No. 9,052,982, which is a continuation of application No. 09/167,899, filed on Oct. 7, 1998, now Pat. No. 8,635,590.

(51) Int. Cl.
*G06F 9/44* (2006.01)

(52) U.S. Cl.
CPC . *G06F 8/33* (2013.01); *G06F 8/70* (2013.01)

(58) Field of Classification Search
CPC .................. G06F 8/33; G06F 8/70; G06F 8/71
USPC ........................................................ 717/110
See application file for complete search history.

(56) References Cited

U.S. PATENT DOCUMENTS

| | | | |
|---|---|---|---|
| 5,263,174 A | 11/1993 | Layman | |
| 5,388,198 A | 2/1995 | Layman et al. | |
| 5,726,883 A | 3/1998 | Levine et al. | |
| 5,790,857 A | 8/1998 | Clifford et al. | |
| 5,881,292 A | 3/1999 | Sigal et al. | |
| 5,930,514 A | 7/1999 | Thompson et al. | |
| 5,933,646 A * | 8/1999 | Hendrickson | G06F 8/71 713/100 |
| 5,937,197 A | 8/1999 | Jury | |
| 6,006,034 A | 12/1999 | Heath et al. | |
| 6,094,679 A | 7/2000 | Teng et al. | |
| 6,182,121 B1 * | 1/2001 | Wlaschin | G06F 17/30168 707/999.001 |
| 6,347,398 B1 * | 2/2002 | Parthasarathy | G06F 8/60 707/999.202 |
| 6,442,548 B1 * | 8/2002 | Balabine | G06F 17/30067 |
| 6,938,205 B1 * | 8/2005 | Hanson | G06F 17/2247 715/234 |

OTHER PUBLICATIONS

Oviatt, S. et al., "Integration and Synchronization of Input Modes During Multimodal Human-Computer Interaction," 1997.

(Continued)

*Primary Examiner* — Anna Deng

(74) *Attorney, Agent, or Firm* — Haynes and Boone, LLP

(57) ABSTRACT

Methods, articles, signals, and systems are provided for adaptively shrinking software. The software includes one or more adaptive features. A tracking facility tracks use of the adaptive features, and when it is determined that a given feature is unwanted or unnecessary in the software configuration preferred by a given user, a separation facility separates the feature from the rest of the software. The feature is then archived or deleted. In this manner, resources such as disk space are conserved, program load time and memory requirements are reduced, and user interfaces and supporting code are tailored to meet the needs of particular users.

20 Claims, 7 Drawing Sheets

(56) References Cited

OTHER PUBLICATIONS

Palen, L., "Groupware Adoption & Adaptation," 1997.
Gentner, D. et al., "Simplified Applications for Network Computers," 1997.
Wood, A. et al., "CyberDesk: Automated Integration of Desktop and Network Services," 1997.
Gutkauf, B., "Accounting for Individual Differences Through GAMES: Guided Adaptive Multimedia Editing System," 1997.
Rozier, E. et al., "Participatory Adaptation," 1997.
Moon, Y., "Adaptive Agents and Personality Change: Complementarity versus Similarity as Forms of Adaptation," 1996.
Ramstein, C., "Adaptive User Interfaces With Force Feedback," 1996.
Fel, S., "Glove-TalkII: An Adaptive Gesture-To-Formant Interface," 1995.
Page, S. et al., "User Customization of a Word. Processor," 1996.
John, B. et al., "Using GOMS for User Interface Design and Evaluation: Which Technique?"1996.
Ullman, B., "Programming Under the Wizard's Spell," May 1998.
Alsop, S., "A Software Junkie Rejects Windows 98," Jul. 20, 1998.
OpenDoc™ for Macintosh: An Overview for Developers, 1994.
Jesse Berst's AnchorDesk postings, pp. 1-15, 1997.
PowerBASIC Revolt Against Bloatware, Jan. 7, 1997.
Destiny Software, 1997.
Pcwebopedia, pp. 1-7, 1998.
Mossberg, W., "Personal Technology," Wall Street Journal, p. BI, Oct. 8, 1998.
Microsoft Windows and the Plug and Play Framework Architecture, Mar. 1994.
Brockschmidt, K., Inside OLE (2d ed.), pp. 3-143, 1995.
Beitz, A., "Dynamic Software Reconfiguration," no later than Sep. 22, 1998.
"The customized, digitized, have-it-your-way economy," Fortune, Sep. 28, 1998.
Allison, G. B., "Technology Update," Sep. 1998.
Woller, R., "User Interface Management Systems: The CLIM perspective," no later than Sep. 30, 1998.
"Microsoft Updates Office Suite, but it's Not for the Little Guy," Wall Street Journal, Jun. 10, 1999.
Microsoft Office 2000 Guided Tom for IT Professionals, Jan. 1999.
Microsoft Office 2000 Product Enhancements Guide, Oct. 1998.
World Wide Web using Lynx, Sep. 2, 1997.
New Business/Underwriting, 1998.
LANSA documents, pp. 1-27, various dates.
SAP R/3: Working with R/3 3.0, no later than Jun. 23, 1999.
The SAP R/3 Handbook, pp. 442-451, 1997.
Abacus 21, pp. 1-3, portions from 1995, remainder no later than Jun. 23, 1999.
Coolidge, D. S, "Word 2000: Evolution Triumphs Over Further Revolution" (especially sections on "Smart menus"), accompanying article on Office 2000 by J. A. Eidelman, both May/Jun. 1999.
Kvitka, Andre, "MS Office 2000 impressive for workgroups," (especially section on "Menus that learn"), Oct. 1998.

\* cited by examiner

ADAPTIVELY SHRINKING SOFTWARE

CROSS-REFERENCE TO RELATED APPLICATIONS

This application is a continuation of U.S. application Ser. No. 14/158,132, filed Jan. 17, 2014, which is a continuation of U.S. application Ser. No. 09/167,899, filed Oct. 7, 1998, now U.S. Pat. No. 8,635,590, issued on Jan. 21, 2014, the entire disclosure of each of which is incorporated herein by reference in its entirety.

FIELD OF THE INVENTION

The present invention relates to the technical goal of reducing the demands placed on computer system resources and on users by large, complex software programs, and more particularly to methods, systems, signals, and articles of manufacture for adaptively shrinking software to benefit consumers by identifying and then archiving or eliminating portions of large programs which are not being actively used by a particular person.

TECHNICAL BACKGROUND OF THE INVENTION

Under the direction of experienced and knowledgeable people, software can help doctors identify the source of an ailment, help banks handle millions of transactions accurately, help students search digital libraries, help artists tell stories and engineers build safer structures, and do a thousand other things to entertain, protect, and assist us. Despite the shortcomings of computer technology, automation and other uses of software have generally made the world a better place by facilitating advances in medical research, civil engineering, telecommunications, and other areas that touch our lives daily in a thousand ways we often take for granted. Nonetheless, software is far from perfect.

For an average consumer, one of the most frustrating trends in software development and commercialization has been the tendency for software programs to include more and more features over time. This tendency is sometimes called "feature creep" and examples are sometimes referred to as "bloatware."

Bloatware requires ever larger amounts of hard disk and RAM storage, and ever faster processors. Even worse, it burdens program users with a growing tangle of commands and options and preferences and other features, often symbolized by blocks of buttons, icons, tabs, menu items, and other visual paraphernalia. Some of the new features in word processors, spreadsheets, communications software, and other widely used applications may be useful to many people. But more often than not, people use only a small fraction of the features available in a given program. The rest of the features are just inconvenient noise in one's mental map of the software and wasted space on one's disk or in system memory.

Several approaches have been tried to reduce the problems caused by continually adding new features to programs. One approach replaces arcane commands and command line options, such as those used in UNIX or DOS operating system command interpreters, with graphical user interfaces of menus, folders, and other metaphors, like those used in the Apple Macintosh and Microsoft Windows environments. This makes it easier to identify commands and other features, since one can look them up by flipping through menus instead of committing them to memory. But a program's menu hierarchy can still become quite large and confusing as additional features and corresponding menu commands or state variables (sometimes called "options" or "preferences") are added to the program.

More generally, many studies have been done to determine the desirability of different user interface designs. For instance, mouse-driven designs have been compared with keyboard-driven designs and with designs that use a combination of keyboard and mouse input. Different color combinations have also been tested. Some of these design attempts have included user models, logs, or other means for recording the behavior of an individual user for subsequent analysis by the interface designers.

Some user interface designs would replace mouse-driven menus with a voice-driven interface, whereby the user enters commands and data by speaking it instead of using a mouse, light pen, keyboard, touch-screen, or similar input device. This could require users to once again begin memorizing the commands they wish to use, or else make it necessary to look up commands with some help facility. Alternatively, a voice-driven interface could require sophisticated speech recognition and natural language interpretation capabilities. Neither approach directly addresses the problem of "wasted" features, namely, program capabilities which are not needed by a given user and thus consume storage space, processor cycles, and other resources without benefiting that user.

Another approach simply provides users with smaller programs containing fewer features. In some cases, such a minimalist program is accompanied by a promise that the vendor's efforts will be put into making the existing features faster, more accurate, more efficient, more reliable, more readily available, and so forth, instead of putting limited development resources to work on new features. An unspoken (or sometimes spoken!) assumption is that other vendors add features simply to justify a new release to generate additional revenue.

Providing users with a small but carefully selected feature set is a worthwhile approach to reducing bloatware. Unfortunately, not everyone agrees on which features belong in a minimalist program's reduced feature set. Feature creep seems almost inevitable, either by continual expansion of the minimalist program or by abandonment of it altogether in favor of a larger program that has one or more desired features which are not found in the minimalist program.

Yet another approach focuses on making the interface itself adaptable or customizable by users. For instance, users may be allowed to change color palettes, modify menus, create macros, and/or to hide or reposition toolbars. Some of these customizations could be used to reduce interface complexity.

But customizing an interface does not necessarily reduce interface complexity, much less reduce program size. For instance, macros may be additional features rather than substitute features, so that they actually increase the feature set presented to the user. Toolbar and menu visibility control is only helpful if the interface features are grouped such that a user wants to see all of them or none at them at a given time. The process of hiding features or making them visible must also be easy and convenient.

Moreover, even when customized interfaces hide features from immediate view, the underlying code to implement those features is still part of the program. The program itself is not any smaller. It simply appears at first glance to have fewer features.

An approach to feature selection which is used by many software vendors involves gradual classification of program features through feedback provided by the program's users.

This feature selection process begins with the design, implementation, and debugging of the first version of the program. The program is released to users, and sooner or later the vendor receives and reviews comments from the users. In response, the source code is modified, the executable is rebuilt and debugged, and the new version is released. Comments on the new version are received and reviewed, the source is modified again, and the cycle of revisions and new versions continues. Initially the program's users are the program designers and the programmers themselves. Later, the users include alpha and beta testers, and finally, they include people who paid for the right to use the software. Over the course of several (sometimes many) versions, the vendor learns which features are the most popular, and modifies the program accordingly.

However, selecting features based on user comments in this manner has several major drawbacks. First, it can take months or even years. Second, because the process takes so long and is subject to influence from so many sources, the feature set may never stabilize. Third, a user who frequently uses a feature which is not popular with other users may lose access to that feature in a new version. This is particularly frustrating if the new version contains improvements not found in the current version, forcing the user to choose between the improvements in the new version and the frequently used feature in the old version. Finally, for a variety of reasons, many vendors have historically chosen to add features far more often than they chose to remove them, leading to the present bloatware problem.

Extensive efforts have been directed toward making it easier to add code to an existing program. Patching and other dynamic reconfiguration techniques; software components ranging from COM and OLE and OpenDoc components to *.DLL files to Java components to Ada and Modula-2 packages and modules; better networking in general and electronic software distribution in particular; enlarged hard drives and falling hardware prices; and improved software development environments and tools all make it continually easier to add code and features to software. Although the ability to add features and the ability to fix bugs with little or no intervention by users can be beneficial, these abilities do not address the problem of dealing with features that are unwanted or unneeded by a given user.

Software is used in various contexts to gain information about various types of user preferences. For instance, the usage of an entire program or a software component such as a Java applet may be monitored to permit metered licensing based on the number of concurrent users of the program or component and/or the length of time during which copies of the program or component are loaded for execution. Such monitoring provides a general indication about the popularity of the program or component as a whole, but it does not say much about a given user's thoughts concerning individual features.

In another context, software agents, cookies, demographic databases, and other means are used to track user preferences on books, music, discussion topics, and other things. Sometimes the information is merely used for targeted marketing; sometimes it is used to make guesses about which products a user might like. Regardless, however, this approach does not track individual software features to determine which ones are wasted from a given user's point of view.

In yet another context, programmers use tools such as debuggers and profilers to identify sections of source code that consume large amounts of processor time or other resources, so that opportunities for improved efficiency are more readily identified. However, any resulting changes are made in a master copy of the program which is eventually distributed to many users, so individual user preferences are not addressed.

In short, it would be an advancement to provide a new approach to software design which promptly and conveniently provides software users with the functional features they desire, without burdening their computers and their minds with unwanted features. Such an approach is disclosed and claimed herein.

BRIEF SUMMARY OF THE INVENTION

The present invention relates to methods, articles, signals, and systems for reducing software complexity seen by a program's user and reducing resource demands on the user's system. Over time, a program according to the invention will adapt itself to a particular user by archiving or completely eliminating features the user does not use. This adaptive shrinking is achieved by meeting three main requirements.

First, the software program is designed for easy separation of one feature from another, or at least for easy separation of a group of features from the other features. The features may be embodied in anything from a set of operating system tools and utilities to a set of word processing or spreadsheet manipulation routines; the invention works both with consumer applications and with operating systems or other programs that generally interface directly with other pieces of software rather than with people. In each case the software is extremely modular, in the sense that code for one feature generally need not be present on the user's computer to run another feature on the computer.

The second main requirement is a facility for tracking which features are used by which users to identify candidates for archiving or removal. Although the concept of tracking features according to the invention is new, technology for tracking features will be readily prepared by those of skill in the art. For instance, simple logging of commands has been done to create demonstrations by playing back the log, and to help automate debugging by using the log as a test suite to check program performance after program modifications are made.

The third and final main requirement is a facility for separating features and disposing of them. Separation may be accomplished while the program is running, or features may be marked first and then separated out the next time the program starts. The separated (unused) features may be archived in the sense that they are on disk but not loaded, to give the user one (or more) last chance to start using them. Or they may be archived in the sense that they are stored in compressed form, or stored only at a remote location. The separated features may also be eliminated by removing them completely from the user's local disk (possibly with the option of reloading them from the vendor if they are needed later). In either case, the program is modified to run without the separated features. The menu entries for separated features are not merely grayed out; they are removed. Moreover, code such as *.DLL or COM or OLE components used only by the separated features is not loaded into memory and is not invoked (at cost of a runtime error) by the program.

In some embodiments, features may be removed one-by-one; in some they may be removed in groups which correspond to their organization in the menu hierarchy. For instance, in one embodiment of an adaptive application such as a word processor or spreadsheet, each adaptive feature in an Insert menu, a Format menu, and a Tools menu is separately removable, while the adaptive features in a Graphics menu and a Table menu are removable only as a group. In place of, or in addition to, tracking feature use by individuals, use may be tracked by work groups or departments. In this manner, features needed by no user in a specified set of users can be identified and eventually removed.

One inventive approach combines the identification and removal of unwanted features with electronic distribution of adaptive features. Individual software features or small sets of closely related features are downloaded over a network and presented to users on a trial basis. If a given user uses a given feature enough to show more than mere curiosity, then that feature is left in place for further use. Other features, which are used only a few times or not at all, are automatically removed. Formally, this could be called an "iterative aggregation and customization method." Informally, the idea is to let users load up on trial features, knowing that only the features they want will remain on their systems. Such feature distribution can be combined with feature-by-feature licensing that requires payment only if the user shows a desire to keep a given feature by continuing to use the feature after the trial period. Unwanted features are automatically removed from the user's system and the user is not required to pay for them.

In short, the novel software adaptively shrinks over time to eliminate unused features. Much effort has gone into making it easier to add functionality to software, such as by programming language design, program development environments, programming paradigms, and "plug-and-play" modular architectures. Too little effort has been spent on ways to make software smaller and simpler without sacrificing flexibility or the needs of individual users. The present invention provides an approach which shrinks software while adapting it to reflect the needs and habits of a particular user. Other aspects and advantages of the present "shrinkware" will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

In describing methods, devices, signals, and systems according to the invention, the meaning of several important terms is clarified, so the claims must be read with careful attention to these clarifications. Specific examples are given to illustrate aspects of the invention, but those of skill in the relevant art(s) will understand that other examples may also fall within the meaning of the terms used, and hence within the scope of one or more claims. Important terms are defined, either explicitly or implicitly, both here in the Detailed Description and elsewhere in the application file.

Computers and Networks Generally

The invention may be used to adaptively shrink software running on an individual computer or to adaptively shrink software running on one or more computers in a network. The shrinking is performed to better reflect the preferences of individual software users. A user may be a person, or it may be a software task or agent or other computer process acting legitimately on behalf of a person. Adaptive shrinking may also be performed on behalf of a defined subset of users, such as a group having certain access permissions, or a department.

Figure 1:
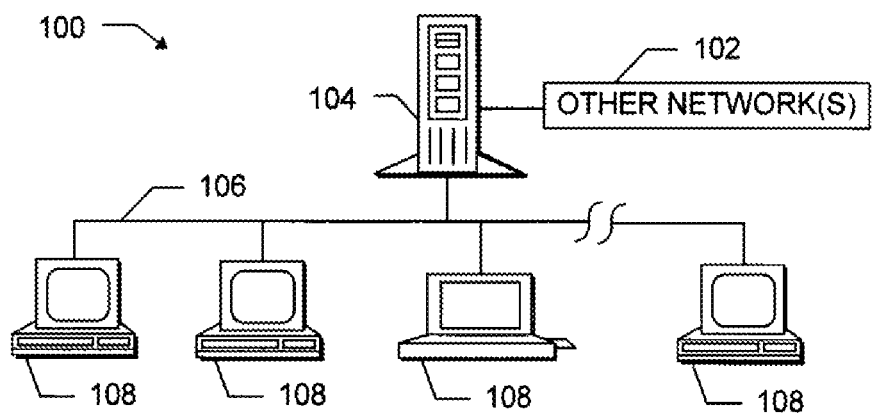
FIG. 1 is a diagram illustrating one of many possible computer networks and several computers suitable for use, as a network or as individual systems, according to the present invention.

FIG. 1 illustrates a network 100 which is one of the many possible networks suitable for adaptation and use according to the present invention. Suitable computer networks 100 include various networks, such as local area networks, wide area networks, metropolitan area networks, and/or various "Internet" or IP networks such as the World Wide Web, a private Internet, a secure Internet, a value-added network, a virtual private network, an extranet, an intranet, or even standalone machines which are updated by physical transport of media (a so-called "sneakernet").

The network 100 may encompass smaller networks and/or be connectable to other networks 102. For instance, the network 100 may be connectable to other networks 102 such as LANs or WANs or portions of the Internet or an intranet, through a gateway or similar mechanism, thereby forming a larger network which is also suitable for use according to the invention. In many cases, a geographically dispersed network, up to and including a global computer network such as the Internet, is preferred because it tends to increase the range of software features users can choose from. However, more localized networks may also be used.

Each network 100 includes at least two computers. For instance, the illustrated network 100 includes a server 104 connected by network signal lines 106 to several network clients 108. Other suitable networks may contain other combinations of servers, clients, and/or peer-to-peer nodes, and a given computer may function both as a client and as a server.

The computers 104, 108 may be laptop computers, workstations, disconnectable mobile computers, servers, mainframes, network computers or lean clients, personal digital assistants, or a combination thereof. Each computer 104, 108 includes at least a processor and a memory; the computers may also include various input devices and/or output devices. The computers 104, 108 may be uniprocessor, multiprocessor, or clustered processor machines. A given processor may include a general purpose device such as a 80×86, Pentium (mark of Intel), 680×0, or other "off-the-shelf" microprocessor. The processor may include a special purpose processing device such as an ASIC, PAL, PLA, PLD, or other customized or programmable device. The memory may include static RAM, dynamic RAM, flash memory, ROM, CD-ROM, disk, tape, magnetic, optical, or other computer storage medium. The input device may include a keyboard, mouse, touch screen, light pen, tablet, microphone, position sensor, pressure sensor, thermal sensor, or other input hardware with accompanying firmware and/or software. The output device may include a monitor or other display, printer, speech or text synthesizer, solenoid, switch, signal line, or other process controller.

The network 100 may include communications or networking software such as the software available from Novell, Microsoft, Artisoft, and other vendors, and may operate using TCP/IP, SPX, IPX, and other protocols over twisted pair, coaxial, or optical fiber cables, telephone lines, satellites, microwave relays, modulated AC power lines, physical media transfer, and/or other data transmission "wires" known to those of skill in the art. Standalone computers (workstations, laptops, personal digital assistants, or others) 104, 108 may also be configured according to the invention; a network is present in many embodiments but is not required in every embodiment.

In one embodiment, at least one of the computers 104, 108 is capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, PROMs, random access memory, flash memory, and other computer system storage devices. The physical configuration represents data and instructions which cause a computer system to operate in a specific and predefined manner as described herein. Thus, the medium tangibly embodies a program, functions, and/or instructions that are executable by computer(s) to adaptively shrink software substantially as described herein.

Suitable software languages and tools to assist in implementing the various devices, systems, and methods of the invention are readily employed by those of skill in the pertinent art(s) using the teachings presented here and programming languages and tools such as Java, Pascal, C++, C, database languages, APIs, SDKs, assembly, firmware, microcode, and/or other languages and tools.

A Configured Computer

Figure 2:
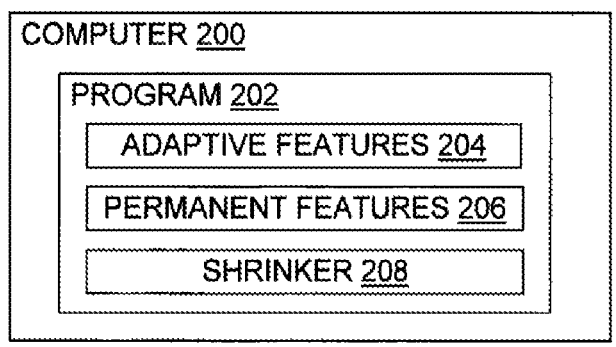
FIG. 2 is a diagram illustrating a computer configured for individual use according to the present invention.

FIG. 2 illustrates a computer 200 configured for software feature selection according to the invention. The computer 200 may be one of the computers 104 or 108 in a network such as the network 100, or the computer 200 may be a standalone computer.

A program 202 on the computer 200 includes one or more adaptive features 204, zero or more permanent features 206, and a shrinker 208. The program 202 may be an application program such as a word processor, spreadsheet, presentation or paint or other graphics program, contact manager, database manager, an email or groupware program, or web browser. It may be a standalone application program or it may be integrated within an operating system. Indeed, the program 202 may itself be part or all of an operating system, file system, BIOS, or other piece of system software. It may be a standalone program which communicates rarely or never with like programs, or it may be a collaborative program used by a group, or it may be part of an integrated suite of applications. Regardless of the type of services provided by the program 202, however, it must be capable of adaptive feature selection as described herein; the program 202 may not be a single indivisible executable whose features are presented to users in an all-or-nothing manner.

The adaptive features 204 of the program 202 are those features which can be selected for removal from the program 202 by the shrinker 208. In some embodiments, adaptive features 204 may also be added to the program 202. However, added adaptive features 204 are subject to later removal by the shrinker 208.

The choice of which features are adaptive and which are permanent rests, at least initially, with the designer of the program 202. However, those of skill in the art will appreciate the following observations.

First, features which obtain necessary input or provide necessary output are best implemented as permanent features 206 rather than adaptive features 204. Examples include file I/O and printer and screen output in most application programs. However, features that are often considered necessary can be optional in some situations. For instance, if the program 202 is tailored sufficiently to its users, no Help feature is needed. Likewise, if a given computer has no floppy disk drive (communicating instead by other removable media and/or by a network link), then no floppy disk I/O routines are needed. Assumptions about what code is necessary should be rigorously identified and examined, with the goal of making conscious design decisions that tend to favor the implementation of features as adaptive rather than permanent.

Second, features which are presently shared by different programs are good candidates for adaptive features 204. Examples include spell checkers, code to insert a spreadsheet in some other type of document, and many operating system functions. If such code is not needed by a given user, then removing it will make the user's system faster and easier to use, and will delay the time at which a larger hard drive or faster processor or more memory must be purchased.

Third, systems which are used by different people for different purposes will provide correspondingly small user benefits through adaptive feature selection. The set of features used is less likely to stabilize enough to identify good candidates for removal, and there could be many more situations when a desired feature was removed just before the next user tries to use it. Even if the feature is restored or replaced, the cost incurred includes system overhead and user frustration.

Fourth, suppose a feature appears to be good candidate for implementation as an adaptive feature 204 because it is rarely used, and suppose the feature's placement in the program 202 interface is relatively obscure. It may be that the feature would be used more, and hence be a good candidate for implementation as a permanent feature 206, if the program 202 interface were designed differently. This may be tested by implementing the feature as an adaptive feature 204 and explicitly drawing the user's attention to it. If the feature continues to see little or no use, it will be removed by the shrinker 208. On the other hand, if the feature sees a dramatic increase in use by many users, it may be added tp the set of permanent features 206 in conjunction with a revised program 202 interface that makes the feature more accessible.

Finally, the usage tracking facilities described here can be used to track permanent features 206 in addition to tracking adaptive features 204. Indeed, one method of implementing the program 202 includes beginning with a version in which all features are permanent, tracking usage with a shrinker 208 or other means, and then re-implementing the little-used and/or unused features as adaptive features 204 in a new version of the program 202.

The shrinker 208 monitors feature usage and eventually separates out unused adaptive features 204. A given shrinker may be implemented with one or more scopes of responsibility. Thus, it may be part of an application program which is responsible only for adaptive features 204 in that program. The shrinker may be a permanent feature of the program. Alternatively, the shrinker may be a separate component of a program 202, in a configuration like that shown in FIG. 2. In that case, the shrinker 208 may eventually remove itself when it is no longer being used.

Figure 3:
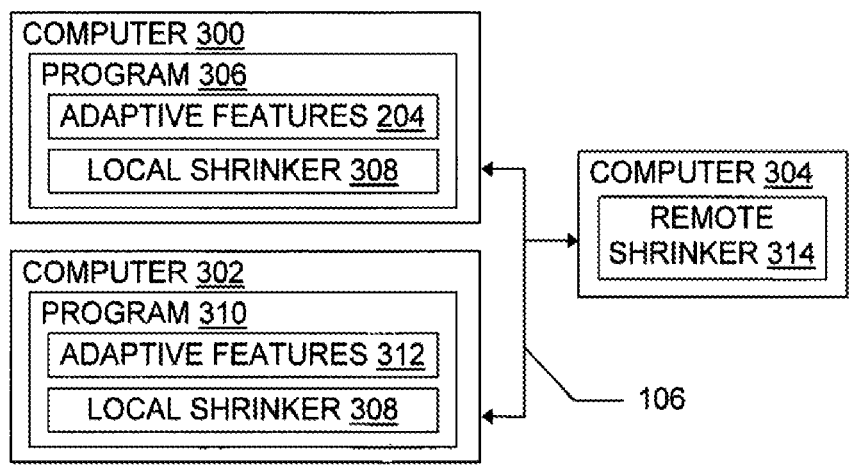
FIG. 3 is a diagram illustrating a network of at least three computers configured for use according to the present invention, with two of the computers each containing adaptively shrinking software which is managed in part by the third computer.
Figure 4:
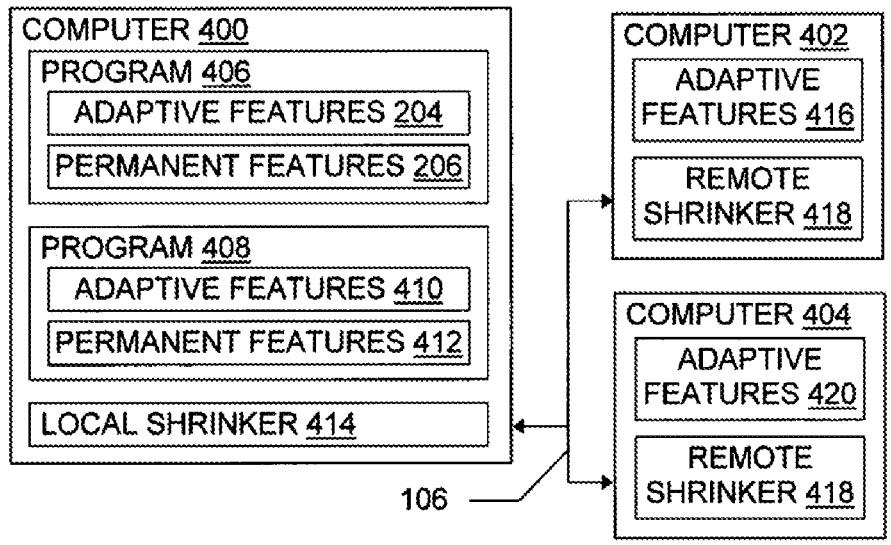
FIG. 4 is a diagram illustrating a network of at least three computers configured for use according to the present invention, with two of the computers each providing adaptive features and assisting in the management of two adaptively shrinking programs which are located on the third computer.

A given shrinker may also be implemented as a background process which manages adaptive feature selection in multiple applications 202. A shrinker which is an integral part of a local operating system on a computer could likewise perform adaptive feature removal on several application programs on that computer. On a network, a shrinker may have an even broader scope of responsibility by operating as a network utility which manages (tracks and shrinks) multiple applications and other programs on multiple computers in the network. FIGS. 3 and 4, which are discussed further below, illustrate shrinkers and adaptive feature selection in a network such as the network 100.

At the other end of the spectrum, a shrinker may be embedded in one or more individual or grouped library modules, packages, cabinets, files, or other program components. That is, shrinking may be localized so that a feature or a closely related group of features includes code for tracking its own use and for removing itself (politely or not, with a flourish or not) when it is apparently no longer needed or wanted. In general, however, a feature should not be granted permission to remove other features. Only an authorized shrinker should be permitted to remove other code.

Certificates, credentials, passwords, tokens, keys, digital signatures, and other familiar authentication and access control tools and techniques may be used to authenticate the shrinker(s) in a system. They may also be used to prevent unauthorized access to, modification of, or removal of code which implements adaptive features. Those of skill in the art will readily apply familiar or novel security and integrity techniques to shrinkers and adaptive features according to the present invention.

Configured Networks

FIGS. 3 and 4 illustrate two of many possible network configurations according to the invention. FIG. 3 shows two managed computers 300, 302 and a manager computer 304. An adaptively shrinkable program 306 on the computer 300 includes adaptive features 204 and a local shrinker 308. Another adaptively shrinkable program 310, located on the computer 302, includes other adaptive features 312 and another instance of the local shrinker 308. The manager computer 304 includes a remote shrinker which communicates with the local shrinker 308 instances over a network link or other "wire" 106.

In the illustrated system the two programs 306, 310 each have a different set of adaptive features 204, 312, respectively, but in other embodiments the sets overlap or are identical. Likewise, each illustrated program 306, 310 lacks any permanent features, but in other embodiments either or both programs have one or more permanent features which cannot be removed by the shrinker 308. Finally, other embodiments may contain one or more managed computers, each having one or more programs containing one or more adaptive features that are managed by a local shrinker 308 and the remote shrinker 314.

In some embodiments of the FIG. 3 system, the computer 304 serves as a repository or backup archive for removed features, in case a user needs to restore a feature after the feature has been removed locally. Each local shrinker 308 tracks adaptive features on the local computer 300, 302 and separates out features which are not being used. The local shrinker 308 consults the remote shrinker 314 to determine the disposition of each feature 204 or 312 that has been separated. If the remote shrinker 314 has an archived copy of the separated feature, then the local shrinker 308 simply deletes the feature from the local computer. If the remote shrinker 314 does not have an archived copy of the separated feature, then the local shrinker 308 sends the feature to the remote shrinker 314 and deletes the separated feature from the local computer after the remote shrinker 314 has archived it.

In some embodiments of the FIG. 3 system, the computer 304 serves as a feature preferences database server for mobile users. Suppose a given user is mobile, using computer 300 at one session and computer 302 at another session. The local shrinkers 308 track use of the adaptive features by the user on the computers 300, 302; a user ID or other means identifies the user to the local shrinkers 308 at each session. The user's preferences are stored in a shared configuration file or otherwise transmitted to the manager computer 304; signals between managed and manager computers are discussed further in connection with FIG. 12. When the user logs in at a given computer, the local shrinker 308 obtains the user's current feature preferences from the manager computer 304 and adds or removes features accordingly to configure the program to be used.

In some embodiments of the FIG. 3 system, the computer 304 serves as a collecting point for information about feature selection. The local shrinkers 308 transmit feature selection data to the remote shrinker 314; suitable signal formats for the transmission are discussed in connection with FIG. 12. The remote shrinker 314 collates the data, optionally searches for patterns, and makes the results available to the local shrinkers 308.

Feature selection data may be as simple as the identity and basic status (in use or separated) of each adaptive feature 204 or 312. Alternatively, the feature selection data may include more detail, such as the date the feature was first installed, the user ID, the feature version number, licensing status (trial period, license accepted, license declined), related features or feature group definitions, and other data.

Patterns to search for include rapid changes in demand for a feature after another feature or other software is installed, statistical patterns that correlate certain features with certain work groups or departments, and statistical patterns that correlate certain features with certain hardware configurations or platforms. Patterns may also provide an early warning of program bugs, since defects in an implementation of a given feature may be located in response to an investigation triggered by an unexpectedly high rate of removal of the feature.

Feature selection data and patterns can be used by local shrinkers 308 to determine which adaptive features to remove. For instance, if a computer is in a work group or has a system configuration that correlates highly with use of a particular adaptive feature, then other features may be given higher priority for removal, even though the feature in question is not being used on the computer in question.

FIG. 4 shows one managed computer 400 and two manager computers 402, 404. Two adaptively shrinkable programs 406, 408 on the managed computer 400 each include adaptive features 204, 410 and permanent features 206, 412, respectively. A local shrinker 414 on the managed computer 400 communicates over the network link 106 with the manager computers 402, 404. Each manager computer 402, 404 has a repository of adaptive features 416, 420 and an instance of a remote shrinker 418. In other embodiments of the FIG. 4 system there are one or more adaptive programs on one or more managed computers which communicate with one or more manager computers. The adaptive features on the various computers may be distinct, or they may overlap or even be identical. Some or all of the adaptive programs may lack any permanent features. Finally, the local shrinker(s) may be implemented on a feature-by-feature, program-by-program, computer-by-computer, or even on a network-by-network basis. One network-by-network shrinker embodiment includes roaming agents which travel around the network tracking feature use and separating unused features.

In some embodiments of the FIG. 4 system, the manager computers 402, 404 "push" new adaptive features onto the managed computer 400. As a result, a user may find new features in an adaptive program from time to time. If the features see continued use after an initial trial period, they remain in the program (however, their continued use may be contingent on the user's agreement to license terms and conditions). If the new features are not of use, they are automatically removed by the local shrinker 414. Unlike conventional demonstration software, which merely disables itself after the trial period ends, demonstration adaptive features remove themselves to avoid cluttering the user's computer if they are not wanted.

Adaptive Features

Figure 5:
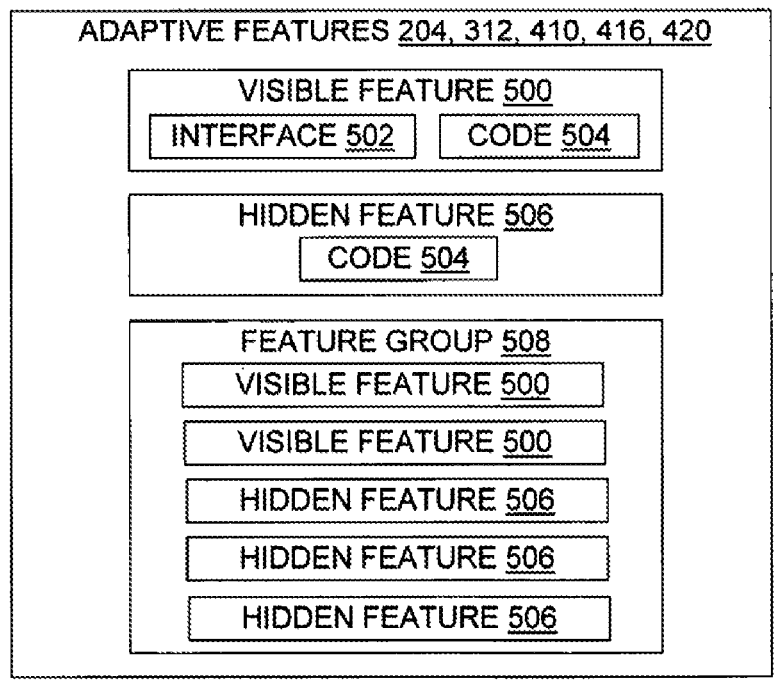
FIG. 5 is a diagram further illustrating adaptive software features according to the present invention.

FIG. 5 further illustrates several aspects of the adaptive features discussed herein. An adaptive feature may be a visible feature 500 which includes both a user interface portion 502 and a supporting code portion 504, or it may be a hidden feature 506 which lacks a user interface portion. For instance, in a word processor a spell checker feature implemented as an adaptive feature would typically be a visible feature 500 having at least a menu entry and a dialog box in its interface portion 502 and having at least code for searching a dictionary in its code portion 504. If the spell checker goes unused for a sufficiently long time, then both the spell checker interface 502 and the spell checker code 504 may be separated from the program by a shrinker.

By contrast, a word processor might also include a format conversion routine which is only invoked to convert files from format A to format B. The conversion routine may be implemented as a hidden adaptive feature 506 with no dialog boxes, menu entries or other interface elements of its own. If the user has not encountered any files in format A after several months of using the word processor, then the conversion routine code 504 may be removed by a shrinker.

The interface portion 502 may include menu text, icons, information about the relative location of menu entries and icons in the rest of the interface, and other visual elements and their context. The code portion 504 may include byte codes, compiled code, microcode, data segments or common areas or other variables, threads, sockets, ports, and resources such as text files for Help features, database files for email addressing features, and other digital information used in providing a feature's functionality.

As illustrated in FIG. 5, adaptive features may be organized in feature groups 508 for adaptive feature selection. In one embodiment, feature groups 508 are optional in the sense that either the group as a whole or individual features in the group can be tracked and separated; in another embodiment, feature groups are mandatory in that features can only be tracked and separated as a group. Regardless, it will be appreciated that even though the illustrated group 508 includes two visible features 500 and three hidden features 506, a feature group 508 may generally contain one or more hidden features 506 and/or one or more visible features 500.

For example, in a word processor a Help group 508 might contain the following adaptive features: keyword and topic searches of Help documentation on the current program; keyword and topic searches of Help documentation on a competing program; and a "wizard" tutorial to step users through simple tasks using default options and parameters. Feature groups 508 could also be defined to reflect user occupations or other demographic characteristics. For instance, if attorneys and scholars are more likely to use footnotes and automatically generated tables of content, then those features could be placed in an adaptive feature group 508 to facilitate their removal from configurations of the program that are used by other people.

Shrinkers

Figure 6:
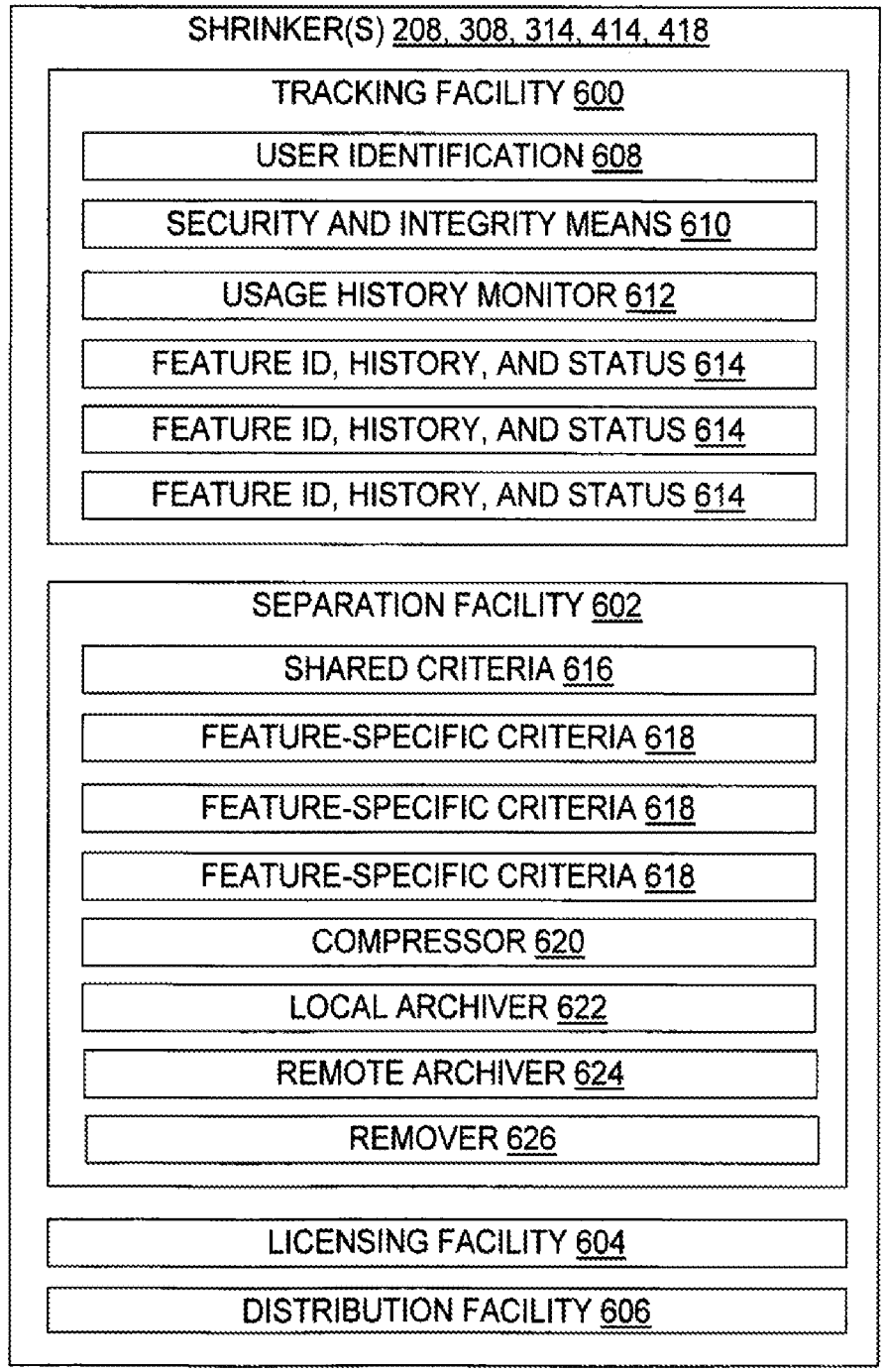
FIG. 6 is a diagram further illustrating tracking and separation facilities for managing adaptive software features according to the present invention.

FIG. 6 further illustrates the shrinkers discussed herein. As noted in connection with FIGS. 2 through 4, a shrinker may be entirely resident on one computer, its functionality may be distributed between two or more computers, or it may roam the network as an agent. Using distributed shrinkers and/or roaming shrinkers lets administrators readily gather information about feature usage from multiple computers, and provides opportunities to coordinate adaptive features from a central location. Regardless of where the shrinker functionality is located, however, as a whole it contains at least a tracking facility 600 and a separation facility 602; these facilities are discussed below.

In some embodiments the shrinker also includes an adaptive feature licensing facility 604 which monitors installation, trial use, paid-license use, and removal of adaptive features, both individually and in feature groups. The license facility 604 presents users with offers to license features, receives acceptances or refusals, and in some embodiments coordinates payment of license fees through electronic funds transfers. The license facility 604 also commands the local shrinker, directly or by way of a remote shrinker, to remove unlicensed adaptive features when they would otherwise be used without authorization.

In some embodiments the shrinker also includes an adaptive feature distribution facility 606 which makes additional adaptive features available to managed computers. The distribution facility 606 may be implemented to use a "pull" approach in which users on managed computers access a catalog of available features and select the features to be installed, and/or a "push" approach in which the managed computers are sent demonstration copies of available features, which are installed automatically but which may also be removed by the local shrinker. In either case, the distribution facility 606 may coordinate with the licensing facility 604.

Tracking Facility

The illustrated tracking facility 600 includes a user identification 608, a security and integrity means 610, a usage history monitor 612, and zero or more adaptive feature records 614. For purposes of illustration only, FIG. 6 shows three adaptive feature records 614.

The user identification 608 allows the shrinker to associate a given set of adaptive feature records 614 with a given user (or group of users). The user identification 608 may be implicit or explicit. Many application programs do not require a user to log in or provide other identification, and do not authenticate the user's right to run the application. The same is true of many operating systems, at least on many single-user workstations, laptops, and personal computers. In such cases the user identification 608 may be implicit. On the other hand, such software may also require entry of a user name when it is installed, and/or have a serial number embedded in it for license administration. The user name or serial number may then serve as an explicit user identification 608. On networks which require login and/or authentication of users, an explicit user identification 608 can be obtained during the login and/or authentication process.

If present, the security and integrity means 610 may provide one or more of the following benefits: preventing substitution of viruses or other harmful code for legitimate adaptive feature code that is being sent to the remote shrinker for archival or being sent from the remote shrinker to the managed computer for installation there; preventing unauthorized modifications or replacement of shrinker code; preventing unauthorized changes to the adaptive feature records 614 of a given user; preventing unauthorized invocation of the separation facility 602; and preventing other unauthorized uses of the inventive system.

These benefits may be obtained using digital signatures, public key infrastructures, certificates, credentials, and other security and integrity tools and techniques familiar to those of skill in the art. For instance, adaptive feature records 614 may be encrypted using a key known only to the relevant shrinker(s); adaptive features and adaptive feature records 614 may be digitally signed to make tampering detectable; and local shrinkers may be required to authenticate themselves to the operating system or to the adaptive program or to a remote shrinker before they are allowed to modify the adaptive program.

The usage history monitor 612 monitors the actual use of adaptive features. This may be done in various ways. The monitor 612 may be implemented as separate routine, a separate thread, a separate process, or a separate program, in relation to the adaptive features being monitored. Some adaptive features may be implemented to signal the monitor 612 each time they are invoked. Others only signal the first time they are invoked or in response to a query from the monitor 612. Other adaptive features keep an internal log; some transmit the log to the monitor 612 periodically, while others send the log signal only in response to certain events such as program clean-up and exit.

Signaling between the monitor 612 and the monitored adaptive features may be accomplished using shared memory, remote procedure calls, a shared file, or other means commonly used to communicate between routines or threads or processes or programs or computers. Suitable choices depend on the relative location and nature of the adaptive feature and the monitor 612, but are readily identified by those of skill in the art. The raw usage data may include keystrokes, mouse operations, network packets, and other low level data, which are then associated with particular adaptive features or permanent features. Much raw data will never be received by the monitor 612 or will be discarded by the monitor 612 as irrelevant. For instance, the content placed by users in a spreadsheet or paint document or word processed text often has little bearing on which features of the corresponding application program are being most used; a particular key or mouse button during text entry or drawing creation is often not a command and hence not an adaptive feature.

Programmers implementing the monitor 612 may draw on lessons learned from user models and user behavior recordation tools used by interface designers or knowledge system builders to record user activity for later analysis by designers and programmers. They may also draw on lessons learned with profiling tools used to identify code (such as nested loop bodies) in which local improvements will noticeably improve overall program performance. Neural nets, genetic algorithms, and other software approaches may also be used to help the shrinker identify unused features and/or select features for removal. Unlike conventional uses of these approaches, however, the object of study here is the feature set of the program as used by a given user or user group.

In one embodiment, each adaptive feature record 614 includes an ID which identifies the adaptive feature or adaptive feature group to which the record 614 pertains, a date indicating when the feature or feature group was installed, separation criteria, usage history, and status as a candidate for removal. Separation criteria are discussed elsewhere herein; another embodiment omits the criteria, making them implicit in the separation facility 602 or explicit in records 618 in that facility 602. As noted, adaptive feature records 614 may also be kept for permanent features in order to identify features which are tracked but not yet separable so they can be considered for re-implementation as tracked and separable, that is, as adaptive.

In some embodiments the usage history in a feature record 614 is a simple tally indicating the total number of uses of the feature since its installation; in other embodiments the date of the most recent use is also stored. Status may be as simple as a bit which indicates, when it is set, that the feature should be removed from the program at the next opportunity. Alternatively, status may be more complex. For instance, status may distinguish between features that are still in the trial period and those that are not, between separable features and permanent ones, between features that are members of a given feature group and those that are not, and/or between features that should be removed immediately in response to a user request and those that can wait until the remaining free disk space falls below a threshold. Other approaches to feature records 614 are also possible, provided that they allow the shrinker to monitor feature usage and (sooner or later) to separate unused features.

Separation Facility

The separation facility 602 separates unwanted or unused adaptive features from the program(s) which included them. In the embodiment shown in FIG. 6, the separation facility 602 also includes criteria for determining when features are unwanted or unused; the tracking facility 600 compares these criteria to the data from the usage monitor 612 and/or the feature records 614 to determine the candidate status of the various features. The embodiment shown in FIG. 6 includes shared separation criteria 616, several examples of feature-specific criteria 618, a compressor 620, a local archiver 622, a remote archiver 624, and a remover 626. In alternative embodiments, the separation criteria 616 and 618 reside instead in the tracking facility 600.

The shared criteria 616 are separation criteria shared by two or more features, up to and including criteria shared by all features. For instance, the shrinker may recognize a "minimize" or "start over" command which separates from the program all adaptive features, or separates all adaptive features added after a specified date. Likewise, most or all features may be subject to separation if a specified condition occurs, such as the expiration of a trial period, or a failure to obtain (or renew) a license. A feature group may be subject to separation if resources needed by it are not present. For instance, floppy disk I/O features are not needed on a computer which has no floppy disk, and networking features are unnecessary on a standalone computer.

By contrast, each of the feature-specific criteria 618 are separation criteria directed at a specific feature. For instance, a spell-checker might be subject to separation only if the user specifically requests its removal. Likewise, each of two features might be subject to separation only if the other feature is also unused or unwanted; a feature that displays text in different colors and one that prints text in corresponding colors provide one example. Features may also be prioritized, so that relatively obscure ones tend to be separated before less obscure ones; obscurity may be determined by analysis of tracking facility 600 information from many computers or on other grounds.

In addition to or in place of the examples above, other separation criteria may also be used. On the one hand, system resources such as the available memory and disk space, and the recommended and actual processor type and speed, may be factors. For instance, in one embodiment no adaptive shrinking is performed, unless it is expressly requested by the user, until the disk is at least 90% full or less than 50 Megabytes of free disk space remains, whichever happens first. The threshold values of 90% and 50 Megabytes are default values which can be overridden by individual users and/or by a network administrator.

Usage may also tracked to determine how recently and how frequently the feature has been used. For instance, features which have never been used are good candidates for separation if the program has been in use each day for the past six months. However, some features might be marked as non-separable or "permanent." For example, in a word processor or spreadsheet permanent features will normally include the file open, save, and close features.

In some embodiments, the user's familiarity with the program is tracked by the tracking facility 600 and no features are separated until the set of features being used has stabilized. This prevents features from being removed, not because they are unwanted, but merely because the user has not yet mastered the full set of features the user will eventually settle on. For instance, suppose a user eventually settles on an actively used feature set of three dozen word processor commands, one of which creates footnotes. It may well be the case that the footnote feature was not used for a month after the software was installed, but is nonetheless important to the user and will be used about once a week thereafter. Separating the footnotes feature too early will inconvenience the user.

On the other hand, there may be a flurry of activity when a program is new, in which many features are tried. One or two uses soon after installation should not immunize a feature from later removal if the user no longer needs the feature and resources become scarce. Methods for determining when to remove a feature are discussed further in connection with FIG. 11.

Conventional tools and techniques are generally used to add code to programs rather than remove it. However, when implementing adaptive features to provide separability those of skill in the art may benefit from such tools and techniques as component models like COM or DCOM or OLE, object-oriented programming models, Java servlet and applet models, languages such as Modula-2 and Ada which encourage hiding details in local modules or packages, dynamic reconfiguration techniques, and other computer programming tools and examples.

Word Processor Example

Figure 7:
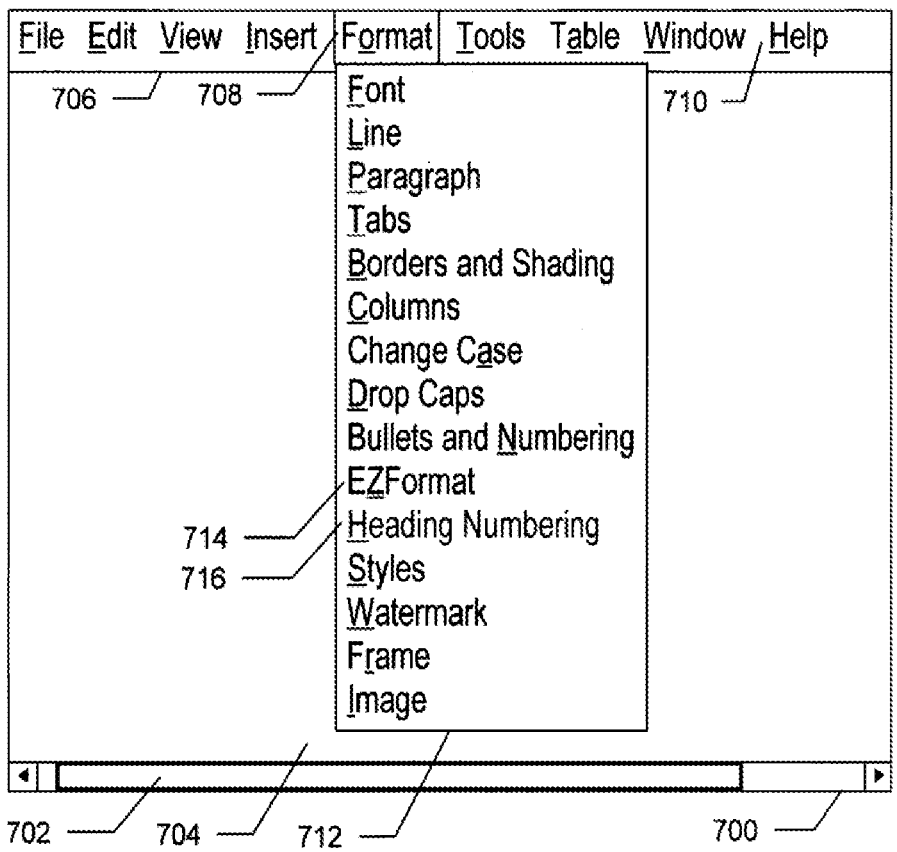
FIG. 7 shows a portion of a user interface of a word processor that is configured according to the invention to include adaptive features.
Figure 8:
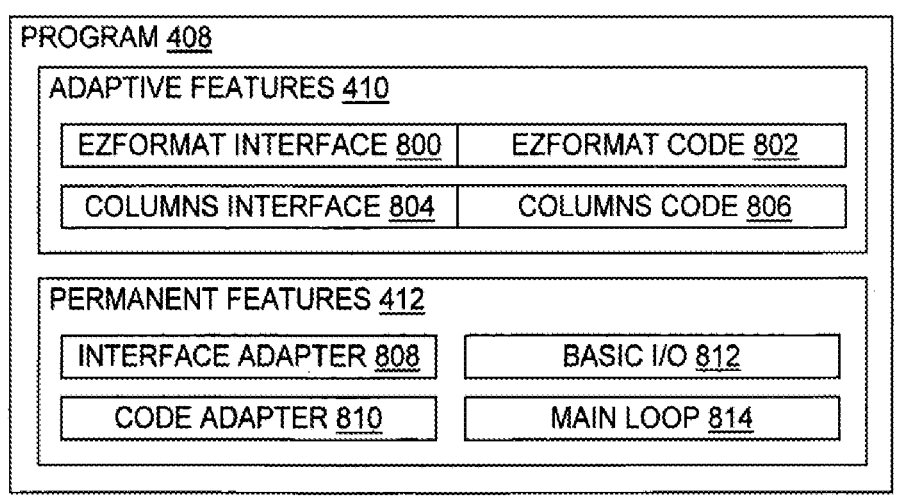
FIG. 8 is a diagram corresponding to FIG. 7, showing certain adaptive features and also showing several other components of the word processor to provide context.
Figure 9:
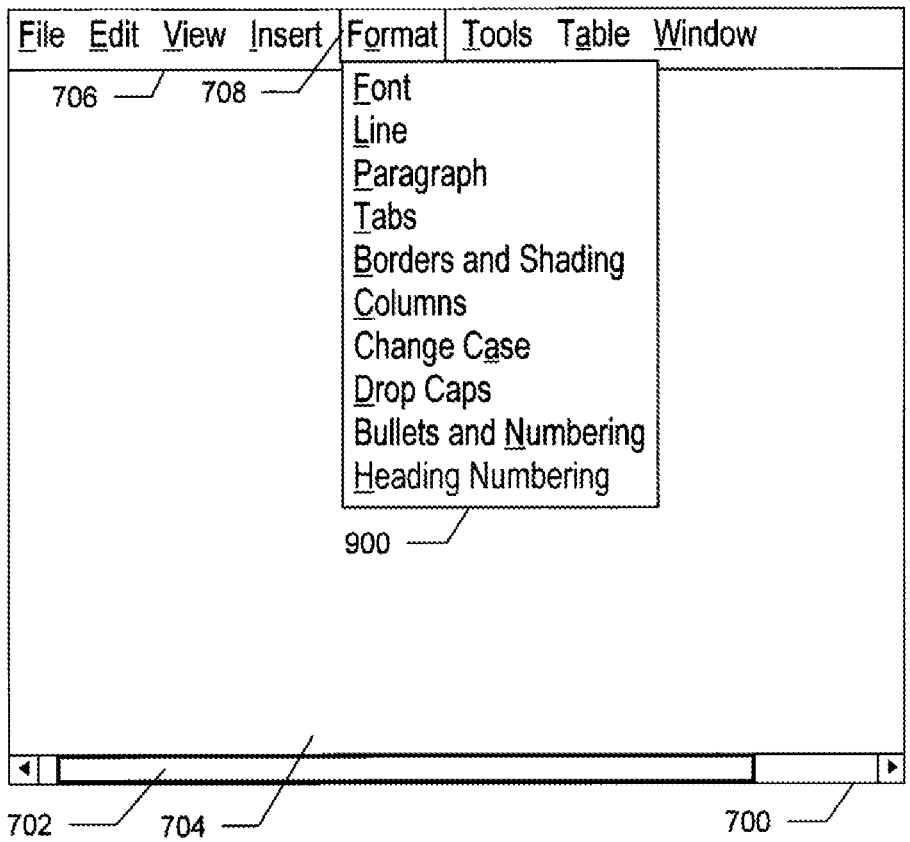
FIG. 9 shows the word processor user interface of FIG. 7 after the removal of several adaptive features.
Figure 10:
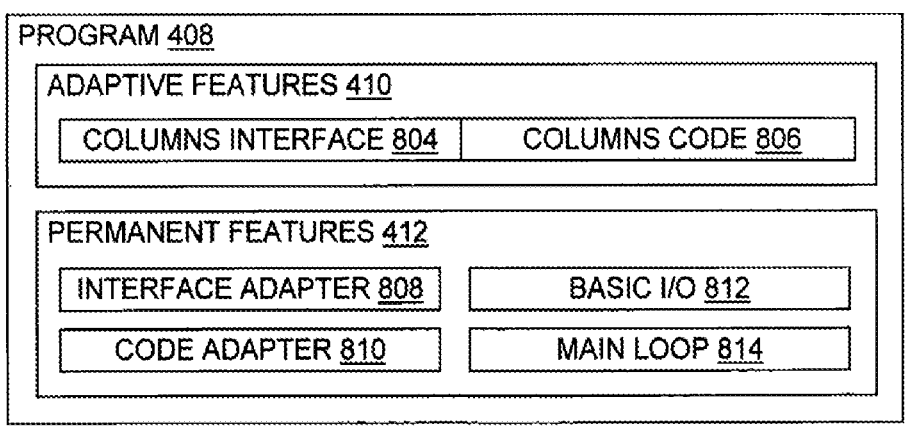
FIG. 10 is a diagram corresponding to FIG. 9, showing components of the word processor which were not removed.

FIGS. 7 through 10 illustrate a word processor constructed according to the invention. FIGS. 7 and 8 illustrate the word processor before several adaptive features are removed, and FIGS. 9 and 10 show the word processor after the features are removed. The entire word processor is not shown; for clarity, only enough is shown to illustrate the invention.

A word processor graphical user interface 700 includes conventional elements such as a scroll bar 702 and a display area 704. The interface 700 also includes a menu bar 706 which appears to the user to be a conventional menu bar having menu bar entries such as a Format entry 708 and a Help entry 710. In the illustrated state, the Format entry 708 is selected and thus a menu 712 appears, presenting both available menu entries such as an EZFormat entry 714 and a grayed-out (currently unavailable) Heading Numbering entry 716. Although specific menu entries, menu bar entries, conventional graphical user interface ("GUI") components, and a word processor are used here to illustrate the invention, those of skill will appreciate that the invention may be used with other menu entries, other menu bar entries, other GUI or text or application program interface ("API") interface components, and with other applications or systems-level programs.

As shown in FIG. 8, the word processor program 408 whose interface is shown in FIG. 7 contains both adaptive features 410 and permanent features 412. The adaptive features 410 include, by way of example, an EZFormat interface 800 and corresponding EZFormat code 802, as well as a Columns interface 804 and corresponding Columns code 806.

The interface portions 800, 804 include the text of the menu 712 entries, and any dialog boxes, icons, graphics, or other interface elements that are specific to the adaptive features and so might be displayed when the features are invoked through the menu 712. The interface portions 800, 804 also include identification of the menu 712 as the place to 408, and any other context needed to modify the interface when the features are added or removed.

The code portions 802, 806 include the supporting code (as opposed to interface code) which performs the task(s) requested by invoking the features. For instance, the code 806 might include code which divides text into two columns and then hands the columns to display code for display in the area 704. In general, supporting code for an adaptive feature may include compiled code, byte codes, assembly, and other instructions, as well as data structures, variables, text files, and other resources specific to the feature.

The permanent features include an interface adapter 808 and a code adapter 810. In an alternative embodiment which allows the shrinker to remove itself, the adapters 808, 810 are implemented as part of a shrinker adaptive feature. The permanent features also include a set of basic 110 routines 812 for keyboard, mouse and screen I/O, and a main loop 814 which obtains a command from the user and then passes control to the appropriate service routine or event handler. Some of the service routines and event handlers may be adaptive features, or a catch-all event handler may be used as the initial starting point for servicing every command that invokes an adaptive feature.

The adapters 808, 810 adapt the program by removing (or in some embodiments, by removing or adding) adaptive features. For instance, the interface adapter 808 removes menu 712 entries and/or menu bar 706 entries when the corresponding adaptive features are removed. In this sense, the interface adapter 808 and the GUI 700 together provide functionality similar to a conventional configurable interface.

However, the corresponding code (such as code 802 and/or 806) is not merely made inaccessible while nonetheless remaining in the program. Instead, the code portion is removed from the program by the code adapter 810. The code may be unloaded from memory immediately, or the program 408 may simply omit the code when the program starts running next time. As noted elsewhere herein, the removed code may be archived locally, archived remotely, or simply deleted.

Those of skill will appreciate that the program 408 must be designed to run properly with our without any combination of the adaptive features. In particular, the features and/or feature groups must be implemented as independent modules or packages or subroutines or threads or other components. Moreover, communication with adaptive features is allowed only by way of the main loop 814 and/or an adaptive feature event handler that "knows" which adaptive features can be invoked in the program's current configuration and which traps any attempt to access instructions or data which are not present in the current program configuration.

FIG. 9 shows the GUI interface 700 after the following adaptive features have been removed: Help, EZFormat, Styles, Watermark, Frame, Image. The interface adapter 808 has accordingly removed the menu bar entry 710 for the Help features group, as well as the menu 712 entries for the EZFormat, Styles, Watermark, Frame, and Image features. The menu 712 has been replaced by a correspondingly simpler menu 900. The code portions corresponding to the Help, EZFormat, Styles, Watermark, Frame, and Image features have also been removed. Thus, as illustrated in FIG. 10, neither the EZFormat interface nor the EZFormat code remains in the reconfigured program 408.

Method Examples

Figure 11:
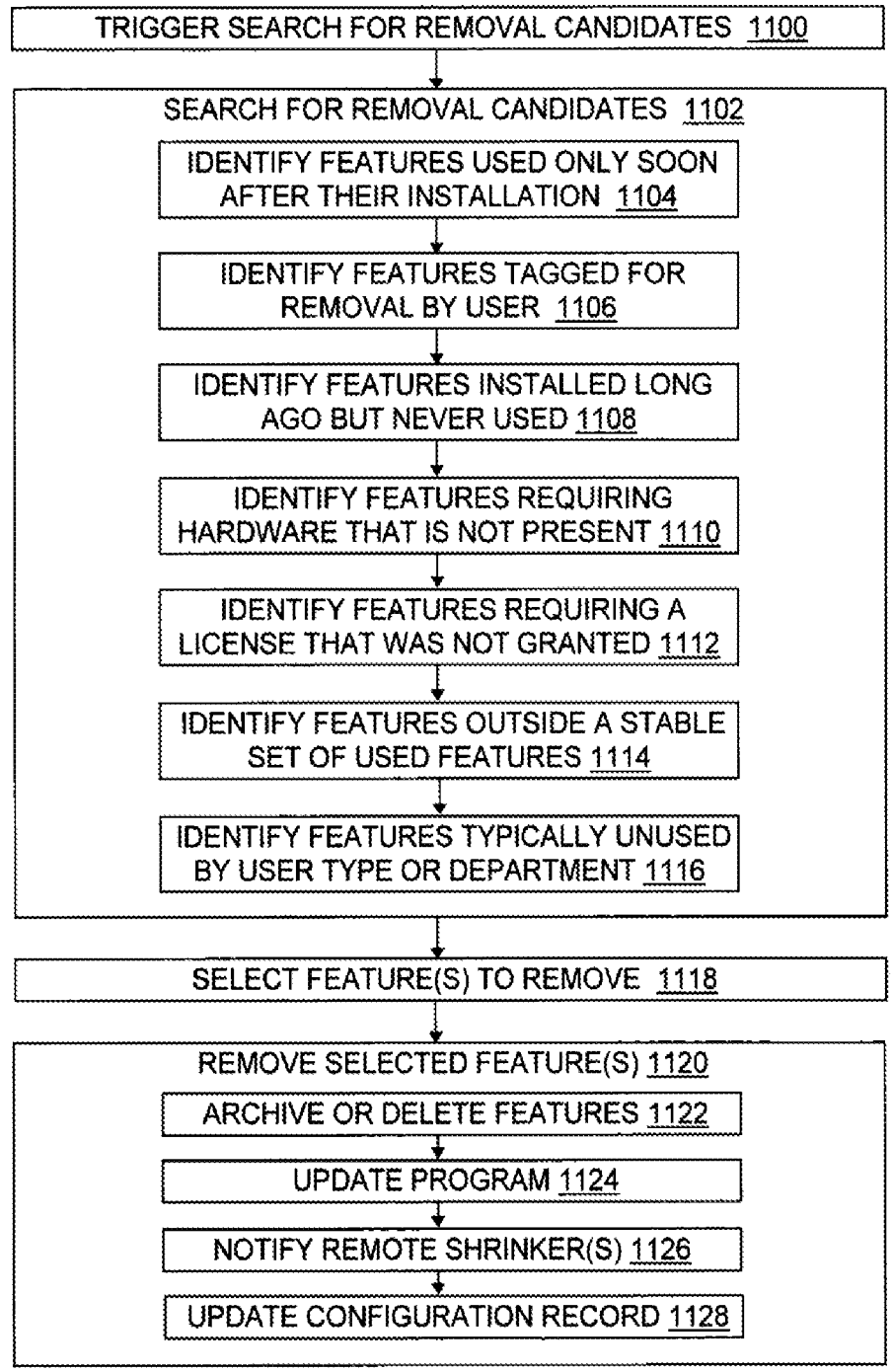
FIG. 11 is a flowchart illustrating feature selection methods of the present invention.

FIG. 11 illustrates feature selection methods according to the present invention. During a triggering step 1100, something occurs to trigger a search for adaptive features that are presently candidates for removal from a program. In various embodiments, the search may be triggered periodically by a local or remote shrinker thread or background process, or it may be triggered expressly by a local or remote user command, or it may be triggered by a certain event such as loading the program for execution or cleaning up before exiting the program.

The search may also be triggered by conditions that suggest system resources are becoming scarce and should be freed, if possible, by removing unwanted or unnecessary program features. For instance, the search may be triggered when available storage space passes a predetermined threshold, as when disk free space falls below a predetermined threshold or when "lack of RAM" errors are detected. The program may also monitor itself and trigger the search when the complexity of its user interface passes a threshold, as measured by the nesting level of commands, the total number of commands, the number of commands in a given menu, the percentage of the screen display consumed by the interface, or another metric.

The search for removal candidates may also be performed proactively. For instance, the search may be triggered by a manager computer 402 or 404 before it sends a new set of demonstration adaptive features to the managed computer 400.

During a searching step 1102, the shrinker searches the feature records 614, separation criteria 616 and 618, and possibly other data such as the user identification 608, to identify features which are presently good candidates for removal.

For instance, a step 1104 identifies features which have been used once or a few times, but only shortly after their installation in the program; they have not been used since. The assumption is that the user initially investigated the features and then decided they were not useful. The meaning of "shortly" varies, but suitable measures might be "within a week of installation of the feature", or "within the first 10% of the calendar time now elapsed since installation of the feature" or "within the first 5% of the program execution time now elapsed since installation of the feature", for instance.

Likewise, a step 1106 identifies features which have been explicitly tagged for removal by the user. These are unwanted features which should be removed unless doing so cripples the program. As noted, adaptive features should be implemented without dependencies on other features, to the greatest extent possible, in order to make separation of a given adaptive feature possible without crippling the program.

A step 1108 identifies features which have been unused for a long period. The duration of non-use may be measured by the elapsed calendar time regardless of actual program use, or may be measured more accurately by the total elapsed time during which the program was in use. What qualifies as a "long time" is a design choice, but it may be influenced by factors such as how frequently the program is used, how extensive the program's feature set is, and the ease with which a removed feature can be restored if the user asks for it. For instance, in a typical word processor which is used almost every day for eight hours or more by only one person, a feature that has not been used after two or three months would be a good candidate for removal.

A step 1110 identifies features that require hardware which is not present. For instance, some computers have no floppy disk drive, some have no local hard disk, and some have no mouse. More subtle examples include color printing capability on a system that has no color printer, numeric coprocessor libraries on systems that have no numeric coprocessor, and networking code on standalone systems. Features that require missing hardware are needed, if at all, only after that hardware has been added to the system. Thus, the features may be removed and archived, to be restored later if and when they are needed, instead of forcibly storing them in the user's active working environment where they consume scarce resources and clutter up the interface.

A step 1112 identifies features for which a license is needed but has not been granted. The user may be given the option of obtaining a necessary license during this step; if the license is sought and granted, the feature in question is not ultimately identified by the step 1112. Features which are present during a trial period or as free demonstrations on some other basis are also not ultimately identified by the step 1112.

A step 1114 identifies features which fall outside a statistically defined set of stable features. During a user's initial encounter with a program, a user often tries various features to investigate their behavior. Over time, users tend to settle on a relatively stable set of features, with the other features being rarely or never used. Statistical analysis of the data obtained by the usage monitor 612 can be used to identify the features in the stable set, and by implication, those which are not in the stable set. A neural net could also be trained to recognize the stable feature set of a given user. A definition of the stable set can be used to prioritize features for removal, by giving those furthest from the stable set the highest priority for removal.

Finally, a step 1116 identifies features that are typically unused by users that share specific demographic characteristics with the current user. For instance, it may be that users in the public relations department rarely or never use a Default Document Templates feature, working instead from a library of existing documents by changing names, addresses, dates, and other facts without modifying the underlying document format or layout. In that case, the step 1116 could be identified if the current user is identified by the user identification 608 as a member of the public relations department and the Default Document Templates feature is implemented as an adaptive feature in the given application program(s).

The steps 1104 through 1116 are illustrative examples. Other steps could also be used to identify features as good candidates for removal. Moreover, some or all of the steps 1104 through 1116 could be omitted in other embodiments of the step 1102, and whichever steps are present could be performed in a different order and/or concurrently.

During a selecting step 1118, zero or more of the features identified during the searching step 1102 are selected for removal. Selection may be accomplished by removing steps with or without final approval by the user. For instance, features that were apparently investigated by the user and then ignored (identified during step 1104) may be removed without further inquiry, while features which have never been invoked by the user (identified during step 1108) might be removed only after the user interactively confirms that they should be removed. In the later case, the user may also indicate whether the identified features should be archived or deleted entirely.

Other factors may also influence selection of features during the step 1118. If the search was triggered during step 1100 by a lack of disk space or a crowded set of menus, for instance, then two approaches are possible. The first approach removes all features identified during step 1102, subject to any user approvals deemed necessary. The second approach prioritizes the identified features and removes only as many features as is necessary to get the triggering condition (disk free space, menu complexity, and so on) back on the other side of the triggering threshold. Features may be prioritized by listing them in order of decreasing resource requirements; for instance, one embodiment gets rid of the largest and most complex features first. Features may also be prioritized according to their distance from the stable set of features, so the least used features are removed first. Of course, other prioritizations may also be used.

During a removing step 1120, selected adaptive features are removed. The code portions 504 and the interface portions 502 (if any) of the adaptive features are separated from the rest of the program, either immediately or the next time the program is invoked.

During a required step 1122, the removed portions are either archived or deleted completely. Archival may employ data compression tools and techniques such as run-length encoding, differential encoding, original or adaptive Huffman coding, dictionary compression methods, and others familiar in the art. Deletion may require removal from nonvolatile storage such as a hard disk, or it may be as simple as freeing RAM memory containing the portion and noting the unavailability of the deleted portions to avoid run-time errors. Registry files and software component managers may be notified or updated as needed. The licensing facility 604 is notified if licensed adaptive features are removed.

A required program updating step 1124 modifies the program GUI interface to reflect removal of user interface portions 502 (if any), and also modifies the program code to reflect removal of the supporting code portions 504 of the adaptive features that are being removed. These modifications are illustrated and discussed in connection with FIGS. 7 through 10 and elsewhere.

The archival and deletion may involve coordination between local and remote shrinkers so the adaptive features are archived and/or deleted locally and/or remotely. In some cases in some embodiments, an optional notifying step 1126 therefore notifies remote shrinkers of the planned (or completed) removal. In response, the remote shrinker may take steps to update feature usage statistics, archive the removed features, notify network administrators, refuse authorization for certain removals, and otherwise behave as discussed in connection with FIGS. 3 and 4 and elsewhere herein.

During an optional user configuration record updating step 1128, configuration credentials or files or other records are updated to reflect the removal(s). This allows the program changes to appear in another program which has some or all of the same adaptive features. Thus, if the user removes a Grammar Checker feature from a word processor, it will also be removed from a spreadsheet and other programs used by that user (possibly subject to express user consent). The user configuration record also allows the program changes to appear in the "same" program on a different computer when adaptive features are being removed from a mobile user's program. For instance, when the user starts the word processor on a different machine, the removed EZFormat feature does not reappear.

Inter-Shrinker Signals

Figure 12:
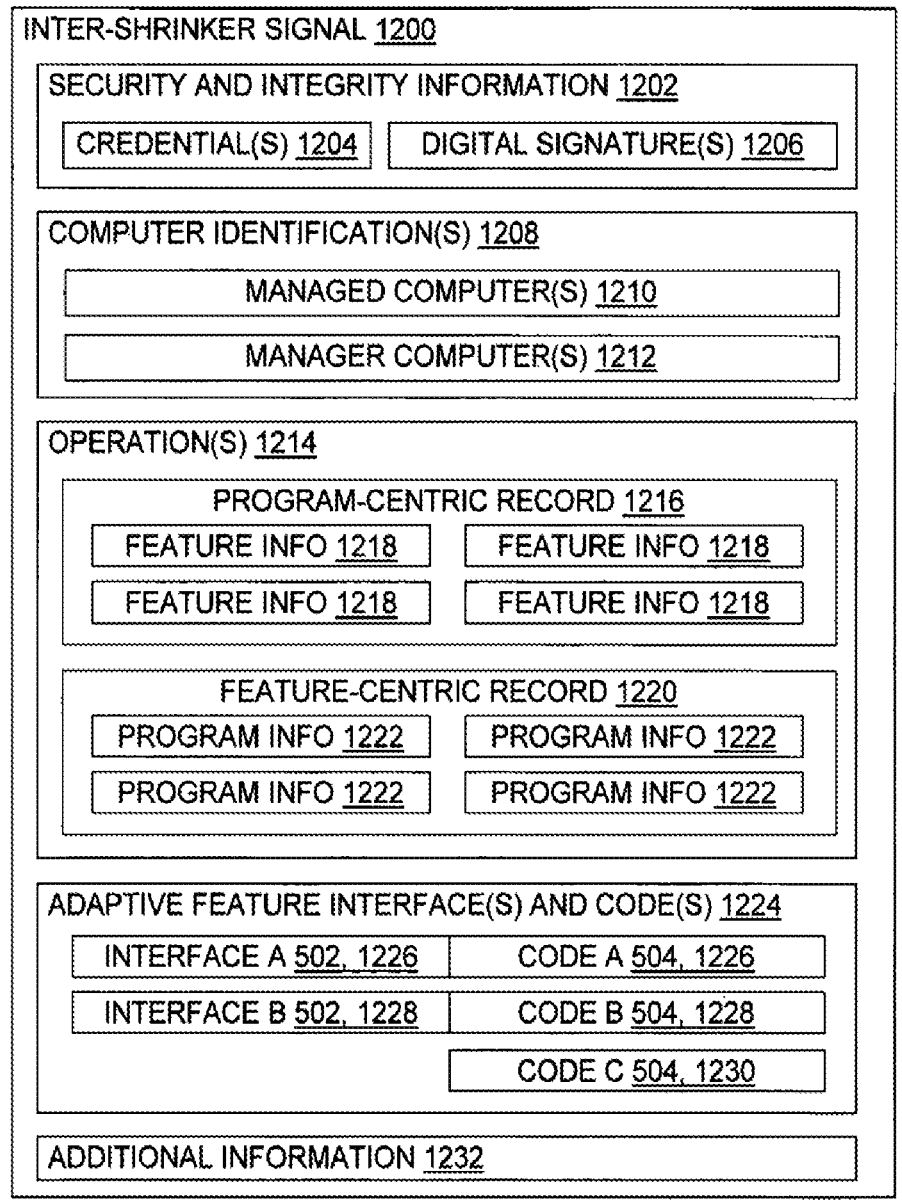
FIG. 12 is a diagram illustrating components of signals between two or more computers configured according to the present invention.

FIG. 12 illustrates components of some of the signals which transmit information between local shrinkers and remote shrinkers according to the present invention. Members of one family 1200 of inter-shrinker signals each include one or more of the illustrated components; a given signal 1200 may organize the components in a different order than that shown. The signal 1200 may also be packetized or otherwise embodied in a "wire" such as a network communications link 106, and it may be supplemented by address, error management, network protocol, and other information.

An optional security and integrity information component 1202 includes one or more credentials 1204 for authenticating one shrinker to another shrinker. The credentials may be formed using symmetric keys, public keys, checksums, and/or other familiar tools and techniques. The signal 1200 may also include one or more digital signatures 1206 to detect tampering with the signal's contents. For instance, one signature 1206 might be formed using the contents of each credential, and another signature 1206 might be formed using those contents of the signal 1200 which relate directly to adaptive feature selection.

In some embodiments, the signal 1200 includes one or more computer identifications 1208. For instance, managed computer identifications 1210 identify managed computers such as the computers 300, 302, 400, and manager computer identifications 1212 identify manager computers such as the computers 304, 402, 404. Network addresses, port numbers, socket numbers, global universal identifiers ("GUIDs"), universal resource locators ("URLs"), and/or other identifiers may be used to identify the managed or manager computers. The computer identifications may be used for weak forms of authentication, for administrative record-keeping, for license management, for demographic database maintenance, and/or other purposes.

Unless the operations performed or requested are implicit in the shrinker code, the signal 1200 includes one or more operation records 1214. These may be organized in various ways, two of which (program-centric and feature-centric) are illustrated.

A program-centric record 1216 identifies the adaptively shrinkable program and associates with that identification one or more feature records 1218 representing activity involving adaptive features of the identified program. Each feature record 1218 includes a feature identification, and at least a status and/or requested status. For instance, a given feature record 1218 might identify the Help feature group with a status "marked for removal; will be deleted locally; please delete remotely", or it might identify the individual EZFormat feature with a status "removed; archived locally". The feature record 1218 may contain information that is also found in the feature usage history in the record 614 and/or in the feature-specific separation criteria in the record 618.

Instead of using program-centric records 1216, or in addition to such records 1216, the operations 1214 may include one or more feature-centric records 1220. A feature-centric record 1220 identifies the adaptive feature and associates with that identification one or more program records 1222 to represent activity involving the identified feature in the identified adaptively shrinkable programs. For instance, a record 1220 might indicate that a Language feature has been removed from both a word processor and a presentation graphics program.

If one or more adaptive features are being sent from managed computer(s) to manager computer(s), then the interface 502 and code 504 portions of the features are included as a signal component 1224. In the illustrated embodiment, the implementation portions 502, 504 of two visible features 1226, 1228 and one hidden feature 1230 are part of the signal 1200. Of course, other signal embodiments may include more or fewer portions 502 and/or 504.

Zero or more pieces of additional information 1232 may also be included in the signal 1200. For instance, shrinker updates, remote user configuration files, and other information discussed herein may be sent between the managed and manager computers.

SUMMARY

In summary, the present invention provides a novel way to tailor software to meet an individual's needs without sacrificing the flexibility provided by making a wide range of features available to the user population as a whole. After a given program has been used by someone long enough to identify the features that are likely to be needed, the other features can be removed automatically. This saves disk space, saves memory space, reduces program load time, and reduces the need for ever-more-powerful processors. More importantly, it simplifies the software interface presented to the user without sacrificing functionality the user cares about.

A particular order and grouping may be indicated in examples for method steps of the invention or systems or signals for the invention. However, those of skill will appreciate that the steps illustrated and discussed in this document may be performed in various orders, including concurrently, except in those cases in which the results of one step are required as input to another step. Steps may also be repeated, or combined, or named differently. Likewise, steps or system or signal components may be omitted unless called for in the claims, regardless of whether they are expressly described as optional in this Detailed Description.

Although particular methods embodying the present invention are expressly illustrated and described herein, it will be appreciated that apparatus, article, and signal embodiments may be formed according to methods of the present invention. Unless otherwise expressly indicated, the description herein of methods of the present invention therefore extends to corresponding devices and signals, and the description of devices and signals of the present invention extends likewise to corresponding methods. Unless otherwise stated, any list of included items is exemplary, not exclusive of other items; "includes" means "comprises" not "consists of."

The invention may be embodied in other specific forms without departing from its essential characteristics. The described embodiments are to be considered in all respects only as illustrative and not restrictive. Headings are for convenience only; discussions of a given aspect of the invention may appear in various places throughout the description. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:
1. A method performed by at least one processor, the method comprising:
  providing one or more adaptive features of a computer program;
  providing one or more permanent features of the computer program;
  receiving a feature record corresponding to one of the adaptive features of the computer program, wherein the feature record includes at least a candidate status that indicates whether the one or more of the adaptive features is removable;
  determining, from the feature record, a history of invocation of the one of the adaptive features by one or more users;
  determining, from the feature record, a feature-specific separation criterion associated with the one of the adaptive features;
  comparing, using a computer system, the history of invocation to the feature-specific separation criterion to assess from the feature record, the candidate status of the one of the adaptive features for removal; and
  selecting the one of the adaptive features for removal from the computer program based on the candidate status of the one of the adaptive features.

2. The method of claim 1 further comprising:
   removing a code portion associated with the one of the adaptive features from the computer program based on the selecting of the one of the adaptive features for removal.

3. The method of claim 2, wherein the removing of the code portion includes deleting the code portion.

4. The method of claim 2, wherein the removing of the code portion includes archiving the code portion on a remote computing system.

5. The method of claim 4, further comprising:
   reloading the code portion by restoring the code portion from an archive on the remote system.

6. The method of claim 1, wherein the one of the adaptive features comprises one of a visible feature or a hidden feature.

7. The method of claim 1, wherein a group of the one or more adaptive features are a feature group.

8. The method of claim 7, wherein all of the one or more adaptive features in the feature group must be selected for removal together.

9. The method of claim 7, wherein the one or more adaptive features in the feature group may be selected individually for removal.

10. A method performed by at least one processor, the method comprising:
    detecting a trigger configured to initiate a search for removal candidate features;
    conducting a search for a feature of a computer program that can be removed from the computer program while allowing the computer program to run a different feature;
    evaluating, using a computing system, a separation criterion specific to the feature from a feature record corresponding to the feature, wherein the feature record includes at least a status that indicates whether the feature is removable;
    tracking invocations of the feature to determine a pattern of invocations of the feature;
    comparing the pattern of invocations of the feature to the separation criterion to determine a removal status of the feature from the feature record; and
    selecting the feature for removal from the program based on the removal status of the feature.

11. The method of claim 10, wherein the trigger corresponds to the computer program being run.

12. The method of claim 10, wherein the trigger corresponds to the computer program being exited.

13. The method of claim 10, wherein the trigger corresponds to a local or remote command.

14. The method of claim 10, wherein the trigger corresponds to a periodic background process.

15. A non-transitory computer readable storage medium storing instructions that, when executed by a computer processor, carry out:
    identifying one or more adaptive features of a computer program;
    identifying one or more permanent features of the computer program;
    identifying a separation criterion of one of the adaptive features from an adaptive feature record corresponding to the one of the adaptive features, wherein the adaptive feature record includes at least a candidate status that indicates whether the one of the adaptive features is removable;
    tracking invocations of the one of the adaptive features to determine a pattern of invocations of the one of the adaptive features;
    comparing the pattern of invocations of the one of the adaptive features to the separation criterion to determine a removal candidate status of the one of the adaptive features from the adaptive feature record; and
    identifying the one of the adaptive features for removal based on the removal candidate status.

16. The non-transitory computer-readable storage medium of claim 15, wherein the storage medium has further instructions that carry out:
    removing a code portion associated with the one of the adaptive features from the computer program based on the identifying of the one of the adaptive features for removal.

17. The non-transitory computer-readable storage medium of claim 16, wherein the instructions that carry out the removing of the code portion include further instructions that carry out deleting the code portion from a computer system.

18. The non-transitory computer-readable storage medium of claim 16, wherein the instructions that carry out the removing of the code portion include further instructions that carry out archiving the code portion on a remote computing system.

19. The non-transitory computer-readable storage medium of claim 18, wherein the storage medium has further instructions that carry out:
    reloading the code portion by restoring the code portion from an archive on the remote computing system.

20. The non-transitory computer-readable storage medium of claim 15, wherein the storage medium has further instructions that carry out:
    identifying whether a group of the adaptive features forms a feature group; and determining whether all adaptive features of the feature group must be removed together or whether adaptive features of the feature group may be removed individually.

* * * * *